United States Patent
Zhu (10) Patent No.: US 8,408,635 B2
(45) Date of Patent: *Apr. 2, 2013

(54) ENERGY-SAVING VEHICLE

(76) Inventor: Xiaoyi Zhu, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,913

(22) Filed: Dec. 22, 2011

(65) Prior Publication Data

US 2012/0098295 A1 Apr. 26, 2012

Related U.S. Application Data

(60) Division of application No. 12/559,543, filed on Sep. 15, 2009, now Pat. No. 8,113,569, which is a continuation-in-part of application No. PCT/CN2008/073367, filed on Dec. 8, 2008.

(30) Foreign Application Priority Data

| Dec. 27, 2007 | (CN) | 2007 1 0186155 |
| Dec. 27, 2007 | (CN) | 2007 1 0186156 |
| Jan. 7, 2008 | (CN) | 2008 1 0000302 |
| Feb. 13, 2008 | (CN) | 2008 1 0008130 |
| Jul. 11, 2008 | (CN) | 2008 1 0068379 |

(51) Int. Cl.
*B62D 35/00* (2006.01)

(52) U.S. Cl. ........................ 296/180.1; 296/208
(58) Field of Classification Search .......... 296/180.1, 296/208; 180/903
See application file for complete search history.

(56) References Cited

U.S. PATENT DOCUMENTS

| 4,460,055 A * | 7/1984 | Steiner ........................ 180/7.1 |
| 6,692,066 B2 * | 2/2004 | Fairburn et al. .............. 296/208 |
| 7,185,944 B2 * | 3/2007 | Shahbazi ................... 296/180.1 |
| 2002/0153178 A1 * | 10/2002 | Limonius ..................... 180/2.2 |

* cited by examiner

*Primary Examiner* — Joseph Pape
(74) *Attorney, Agent, or Firm* — Matthias Scholl P.C.; Matthias Scholl (57) ABSTRACT

An energy-saving vehicle including a housing, a pair of front wheels, a pair of rear wheels, and a steering wheel. The housing includes an outer portion, an inner portion, an air-flow channel, at least a first air inlet, and at least an air outlet. The air-flow channel is disposed between the outer portion and the inner portion of the housing. The first air inlet is disposed in the front of the vehicle. The air outlet is disposed at the back of the vehicle. The first air inlet and the air outlet are connected to the air-flow channel. The front wheels and the rear wheels are driven by a power unit. The length of the air-flow channel is no less than that of the upper portion of the housing. The vehicle consumes less energy and travels more stably compared to conventional vehicles.

25 Claims, 8 Drawing Sheets

ENERGY-SAVING VEHICLE

CROSS-REFERENCE TO RELATED APPLICATIONS

This application is a divisional of U.S. Ser. No 12/559,543 filed on Sep. 15, 2009, now pending, which is a continuation in part of International Patent Application No. PCT/CN2008/073367, with an international filing date of Dec. 8, 2008, which is based on Chinese Patent Application No. 200710186155.9, filed Dec. 27, 2007, on Chinese Patent Application No. 200710186156.3, filed Dec. 27, 2007, on Chinese Patent Application No. 200810000302.3, filed Jan. 7, 2008, on Chinese Patent Application No. 200810008130.4, filed Feb. 13, 2008, and on Chinese Patent Application No. 200810068379.4, filed Jul. 11, 2008. The contents of all of these specifications are incorporated herein by reference.

BACKGROUND OF THE INVENTION

1. Field of the Invention

The invention relates to a vehicle, and more particularly to an energy-saving vehicle.

2. Description of the Related Art

For vehicles, upward resistance occurs during high-speed travelling, and automakers try to overcome the upward resistance by increasing weight of the vehicles.

However, increase of weight also results in high energy consumption. Moreover, automakers use ethanol driven vehicles, hydrogen vehicles, air-powered vehicles and so on to replace conventional vehicles whereby saving energy. But an un-neglectable problem with them is that energy consumption thereof is still high after various transmission devices are used.

SUMMARY OF THE INVENTION

In view of the above-described problem, it is one objective of the invention to provide vehicle that features a good energy-saving effect.

To achieve the above objectives, in accordance with one embodiment of the invention, provided is an energy-saving vehicle, comprising a housing comprising an outer portion, an inner portion, an air-flow channel, at least a first air inlet, and at least an air outlet, a pair of front wheels, a pair of rear wheels, and a steering wheel, wherein the air-flow channel is disposed between the outer portion and the inner portion of the housing, the first air inlet is disposed in the front of the vehicle, the air outlet is disposed at the back of the vehicle, the first air inlet and the air outlet are connected to the air-flow channel, the front wheels and the rear wheels are driven by a power unit, and a length of the air-flow channel is no less than that of an upper portion of the housing.

In a class of this embodiment, a cross section of the air-flow channel is curved.

In a class of this embodiment, the air-flow channel comprises a first sub-air-flow channel and a second sub-air-flow channel, the first sub-air-flow channel is connected to the first air inlet, and the second sub-air-flow channel is connected to the air outlet.

In a class of this embodiment, a parabolic concave-convex surface is disposed at the bottom of the air-flow channel and operates to increase a length thereof.

In a class of this embodiment, at least a second air inlet is disposed at the bottom of the housing, and connected to the air outlet via the air-flow channel.

In a class of this embodiment, at least a third air inlet is disposed on one side and at the bottom of the housing, and connected to the air outlet via the air-flow channel.

In a class of this embodiment, an area of the first air inlet is approximately or completely the same as that of a front portion of the housing.

In a class of this embodiment, at least a motor is disposed in the air outlet.

In a class of this embodiment, at least a rotating head with concave or convex helix is disposed in the air outlet and driven by a motor.

In a class of this embodiment, the air-flow channel is divided into at least a sub air-flow channel via a spoiler in the shape of a concave-convex parabola, and the air outlet is connected to the air inlet via the sub-air-flow channel.

In a class of this embodiment, at least an impeller is disposed in the air-flow channel and driven by the air, and the impeller operates to drive a power generator.

In a class of this embodiment, the power unit comprises a gas-storage device and an air motor operating to connect a fuel cell or to compress the air, and the front wheels or the rear wheels are connected to the air motor via a speed reducer.

In a class of this embodiment, a separating plate is disposed at the bottom of the vehicle, the air-flow channel is formed between the separating plate and the bottom of the vehicle, and the air-flow channel is connected to the first air inlet and the air outlet.

In a class of this embodiment, the bottom of the air-flow channel is capable of moving along with the separating plate whereby increasing or decreasing a distance between the bottom of the air-flow channel and the ground.

In a class of this embodiment, an inflating device is disposed on the bottom of the housing, and inflation or deflation of the inflating device increases or decreases a distance between the bottom of the vehicle and the ground.

In a class of this embodiment, the air-flow channel is connected to the first air inlet and the air outlet after being bent whereby forming a main body of the vehicle.

In a class of this embodiment, at least a decorative window is disposed on the first air inlet and/or the air outlet, a constant-flow controller with an adjustable angle is disposed in the decorative window, and the decorative window is in the shape of a square grid, a diamond, a strip, a circular hole, a stream line and so on.

Advantages of the invention are summarized below:

Since air of the air resistance wall and the air resistance hole is induced into the air-flow channel, a pressure region is formed in the front of the vehicle and in the vicinity of the air inlet on each side thereof, and the air is sprayed from the back of the vehicle at a speed higher than the vehicle speed, the air instantly eliminates resistance of the pressure region, and eliminates the low pressure region at the back of the vehicle and a big pressure region generated by the air resistance hole, and forms a high pressure region, which saves energy and increases the vehicle speed.

Since a length of the air-flow channel is larger than that of an upper portion of the housing, air speed is increased. Since under the same condition, air speed in the air-flow channel is greater than the vehicle speed, air pressure at the top of the vehicle stably presses the upper portion of the housing, and thus lift resistance is eliminated, and the vehicle travels more quickly, stably, safely and economically.

BRIEF DESCRIPTION OF THE DRAWINGS

The invention is described hereinafter with reference to accompanying drawings, in which.

DETAILED DESCRIPTION OF THE EMBODIMENTS

Figure 1:
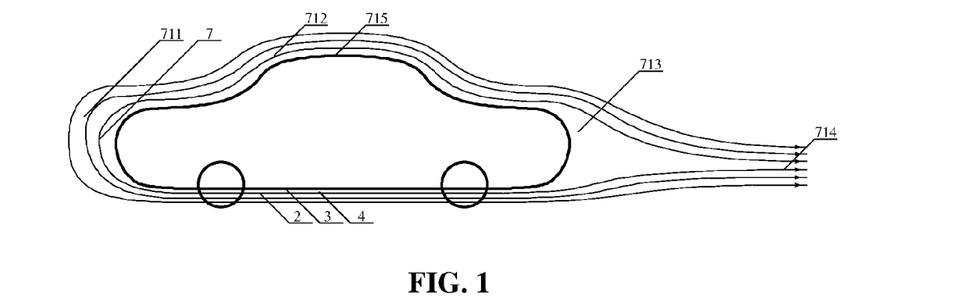
FIG. 1 illustrates resistance applied on a vehicle in operation.

As shown in FIG. 1, as a vehicle travels at a high velocity, it knocks into an air resistance wall 711, and a reacting force forms an air resistance hole 712 firmly surrounding the vehicle. The faster the vehicle travels, the thicker the air resistance wall 711 and the air resistance hole 712 will be, and the higher the resistance will be. A first pressure region 713 is formed between the back of the vehicle and an air resistance hole entrance 714, and brings pressure resistance to the vehicle. The faster the vehicle travels, the higher the pressure resistance will be, and the larger an area of the first pressure region 713 will be. Once the air resistance hole entrance 714 is closed, large air pressure is generated between inside of the air resistance hole 712 and outside thereof, and a second pressure region 715 is formed by the air resistance wall 711, the air resistance hole 712, and the air resistance hole entrance 714, which greatly increase energy consumption of the vehicle. Therefore, to prevent the air resistance hole entrance 714 from being closed is a key point of reducing energy consumption. In this embodiment, the second pressure region 715 is significantly larger than the first pressure region 713.

Figure 2:
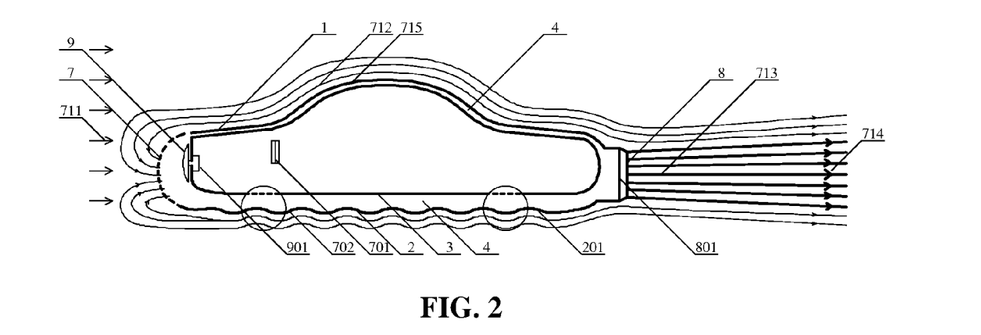
FIG. 2 illustrates resistance applied on an energy-saving vehicle of a first embodiment of the invention.

As shown in FIG. 2, an energy-saving vehicle of a first embodiment of the invention comprises a housing comprising an outer portion 2 and an inner portion 3, an air-flow channel 4, a first air inlet 7, an air outlet 8. The first air inlet 7 is disposed in the front of the vehicle, the air outlet 8 is disposed at the back of the vehicle, and the air-flow channel 4 is disposed between the outer portion 2 and the inner portion 3 of the housing and connected to the air outlet 8. In this embodiment, the air-flow channel 4 is annular.

A rotating head 9 is disposed in the first air inlet 7 and driven by a motor 901. At least a third air inlet 701 is disposed around the vehicle and connected to the air-flow channel 4. A spoiler 201 in the shape of a concave-convex parabola is disposed at the bottom of the outer portion 2, and at least a second air inlet 702 is disposed on the spoiler 201. In this embodiment, the rotating head 9 is in the shape of a disk.

As the vehicle travels at a high velocity, it knocks into the air resistance wall 711. At this time, the rotating head 9 rotates at a high speed, disperses resistance of the air resistance wall 711 under centrifugal force, and enables the resistance to enter the air-flow channel 4, whereby preventing collision between the air and the inner portion 3 and reducing resistance of the air resistance wall 711.

Since air resistance is proportional to a cross section of a windward side of the vehicle, the first air inlet 7 having an area approximately or complete the same as that of a front portion of said housing induces air of a collision surface between the air resistance wall 711 and the housing into the air-flow channel 4, whereby reducing resistance of the air resistance wall 711 and pressure resistance of the second pressure region 715.

Then, air of the air resistance wall 711 around the first air inlet 7 forms the air resistance hole 712 and firmly surrounds the vehicle. Meanwhile, since the spoiler 201 in the shape of a concave-convex parabola is disposed at the bottom of the outer portion 2, a length of a path of the air passing through the spoiler 201 is larger than that of an upper portion of the housing, air passing through an inner surface and an outer surface of the spoiler 201 has an increased speed, and speed of air in the air-flow channel 4 is greater than that in an normal condition, and therefore speed of the air in the air-flow channel 4 is greater than that outside the air-flow channel 4. The second air inlet 702 induces air at the bottom of the spoiler 201 into the air-flow channel 4, which balances speeds of air in and outside the air-flow channel 4. A length of a path of the air passing through the spoiler 201 is no less than that of an upper portion of the housing, whereby reducing or eliminating lifting force.

The air resistance hole 712 firmly surrounding the vehicle is formed by lateral resistance, namely pressure applied to the vehicle by air around the vehicle. Under the pressure, air closely adjacent to an upper portion of the housing of the vehicle is squeezed into the air-flow channel 4 via the first air inlet 701.

If resistance of the air resistance wall 711 and the air resistance hole 712 is reduced, air of the air resistance hole 712 simultaneously reaches the back of the vehicle from all around whereby obtaining good continuity. If the air resistance hole entrance 714 is closed, the vehicle is greatly affected by the second pressure region 715 formed by the air resistance wall 711, the air resistance hole 712, and the air resistance hole entrance 714 and travels with great difficulty. As too much air from the air resistance wall 711 is induced via the first air inlet 7, pressure resistance of the second pressure region 715 is greatly reduced, and at the same time, large quantity of air with a speed higher than the vehicle is emitted from the air outlet 8, which makes it impossible to close the air resistance hole entrance 714. If air in the first pressure region 713 is enough, the first pressure region 713 and the second pressure region 715 will disappear and the pressure region at the back of the vehicle is turned into air with a forward direction. Since large quantity of air is induced into the air-flow channel 4 via the first air inlet 7, the second air inlet 702 and the third air inlet 701, multiple pressure regions are formed therein or somewhere in the vicinity thereof and uniformly distributed thereon, which causes large quantity of air on the surface of the housing is induced into the air-flow channel 4 via the first air inlet 7, the second air inlet 702 and the third air inlet 701. And thus pressure regions are formed and are positive air pressure regions. Since distribution of air is changed, reduction of energy consumption is implemented.

A flexible sleeve 801 is used to adjust a spraying angle of the air outlet 8, whereby closing the air resistance hole as the vehicle travels at different speeds.

Figure 3:
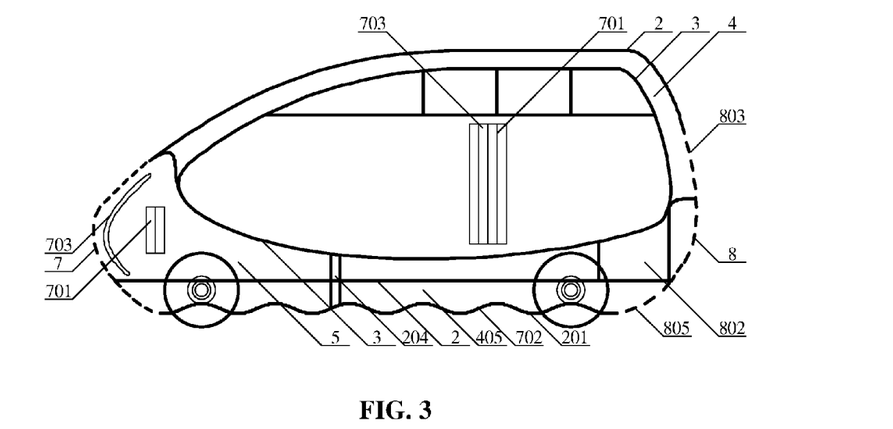
FIG. 3 is a front view of an energy-saving vehicle of a second embodiment of the invention.
Figure 4:
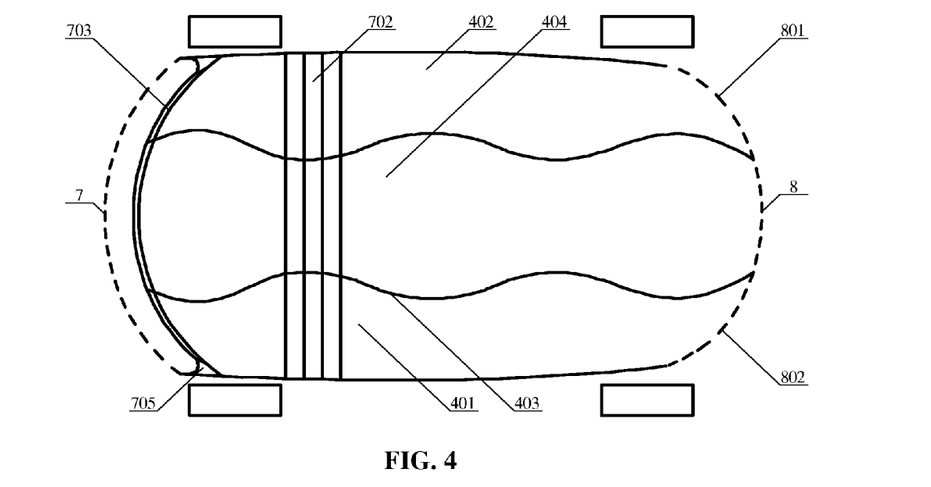
FIG. 4 is a top view of an energy-saving vehicle of a second embodiment of the invention.
Figure 5:
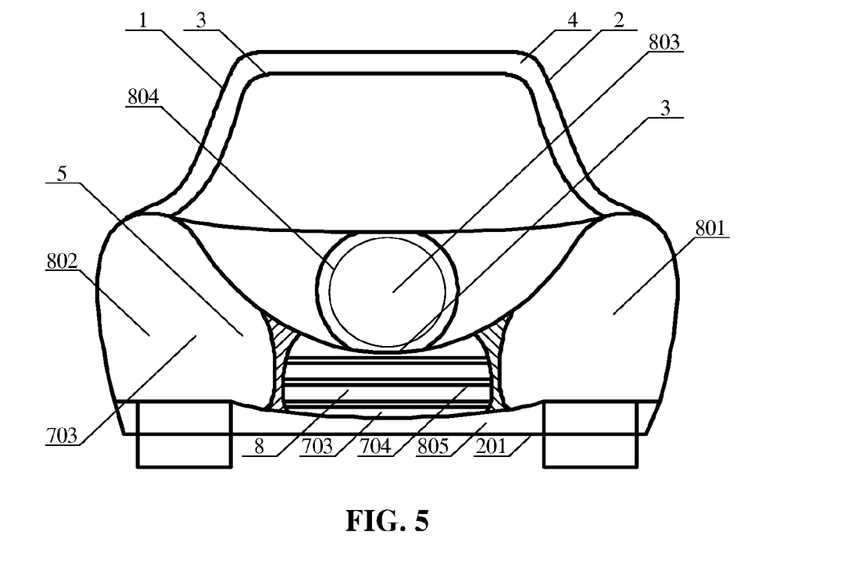
FIG. 5 is a back view of an energy-saving vehicle of a second embodiment of the invention.

As shown in FIGS. 3-5, an energy-saving vehicle of a second embodiment of the invention comprises a housing comprising an outer portion 2 and an inner portion 3, an air-flow channel 4, an airflow hole 5, a first air inlet 7, and an air outlet 8. The air-flow channel 4 is disposed between the outer portion 2 and the inner portion 3 of the housing. In this embodiment, the air-flow channel 4 is circular. The airflow hole 5 can be regarded as a bottom air-flow channel that has a same width as the housing. The bottom air-flow channel is divided into three independent sub-air-flow channels by two spoilers 403, and thus four sub-air-flow channels are formed. The first air inlet 7, a middle air-flow channel 404 and the air outlet 8 are sequentially connected. A left air inlet 7, an air-flow channel 402 and a rear air outlet 801 are sequentially connected. A right air inlet 7, an air-flow channel 401 and a rear air outlet 802 are sequentially connected.

At least a third air inlet 701 is disposed in the vicinity of the housing and connected to the air-flow channel 4 and a middle air outlet 803.

At least a second air inlet 702 is disposed at the bottom of the outer portion 2. Bottom air-flow channels 404, 401 and 402 are divided by the spoilers 403 between the outer portion 2 and the inner portion 3, and thus three independent air layers are formed.

Alternatively, the bottom air-flow channels 404, 401 and 402 may be not completely separated by the spoiler 403, and form a huge air layer. The air outlet 8 is disposed in the middle of the bottom at the back of the vehicle, the air outlet 803 is disposed above the air outlet 8, and the air outlets 801 and 802 are disposed at the back of the air outlet 8.

As the vehicle travels at a high velocity, it knocks into the air resistance wall, and resistance of air resistance wall is induced into the air-flow channels 404, 402 and 401 via the first air inlet 7 having an area approximately or completely the same as that of a front portion of the housing, a decorative window 703, and a vehicle headlight 705. Both sides of the decorative window 703 and the vehicle headlight 705 are in the shape of a stream line whereby reducing air resistance.

Vertical air resistance on a windshield of the vehicle is not reduced, and a pressure region is formed on a front air inlet. Under inward pressure, the third air inlet 701 on one side or at the top of the vehicle induces part of air resistance from the air resistance hole in to the air-flow channel 4, whereby reducing part of resistance from the air resistance wall and the air resistance hole.

The air-flow channel can employs different shapes, and a cross section thereof may be in the shape of an ellipse, a circle, a rectangle, a snake, a loop or a stream line, so that a length of a path of air passing the bottom of the vehicle is no less than that of an upper portion of the housing. In this embodiment, the air-flow channel has a concave-convex surface, and a length of a path of air passing the air-flow channel is no less than that of an upper portion of the housing, and therefore a speed of the air is increased. Moreover, since under the same condition, air speed in the air-flow channel is higher than that in a normal condition (namely a vehicle speed), the second air inlet 702 is disposed between the bottom of the vehicle and the air-flow channel, and an opening state is formed. At this time air speed at the bottom of the vehicle is lower than that of an upper portion of the vehicle, air at the bottom of the vehicle is induced into the air-flow channels 404, 402 and 401 via the second air inlet 702, whereby balancing air at the bottom of the vehicle with that in the air-flow channels 404, 402 and 401. The air-flow channel 402 enables a length of a path of air passing the air-flow channels is no less than that of an upper portion of the housing, and therefore lift resistance is reduced or disappeared, and the vehicle travels more safely, stably and economically.

The air inlets spray air of the air resistance wall and the air resistance wall from the air outlets 8, 801, 802 and 803 via the air-flow channels at a speed higher than or equal to the vehicle speed. If there is a large amount of air, the air resistance hole can be used to close air in the air resistance hole entrance, at this time reverse resistance is turned into forward driving force, surrounds the vehicle, fills the pressure region at the back of the vehicle, eliminate pressure resistance, causes pressure resistance at the back to disappear so that a big pressure cannot be formed, and turns the back of the vehicle into a high pressure region.

The inner portion 3 of the housing is concave, which forms a big airflow hole 5 having a same width as the housing, increases space in the vehicle and increases air speed in the air-flow channel. The independent air-flow channels 404, 401 and 402 can also be semi-independent air-flow channels. Decorative windows are disposed on all the air inlets, and vent holes thereof are in the shape of uniformly-distributed bars.

Airflow controllers 704 are disposed in all the air outlets and the decorative windows 703. An upper surface of an airflow controlling plate therein is parabolic, and a bottom thereof is planar whereby increasing an air speed. The airflow controllers 704 is louver-like and is capable of controlling an angle of spraying and absorbing of air, whereby controlling resistance and lift force generated by different airflow in the air-flow channel 4. In emergency cases such as reducing a speed or braking, the air outlet closes the airflow controllers 704, large resistance is generated in the air-flow channel by high-speed air, which naturally reduces the vehicle speed, and makes the vehicle travel more safely with the help of a brake.

The vehicle headlights 705 are disposed on both sides of the outer portion 2 of the housing.

Alternatively, the airflow controller 704 is disposed in the decorative window 703. A motor 804 with an adjustable rotating speed is disposed in the air outlet 803 and operates to spray and absorb air. One end of the motor is connected to the air-flow channel 4. As the vehicle travels at a high velocity, the first air inlet 7 induces air of the air resistance wall into the air-flow channels 401, 404 and 402, and then the air is sprayed from the air outlets 8, 802 and 801. At this time the motor 804 absorbs air, and increases the air speed via the airflow controller 704 in the decorative window 703 and the air-flow channel 4. The airflow controller 704 is capable of controlling an angle, and both sides thereof are parabolic.

Since the motor 804 has strong suction power and is capable of quickly absorbing air in the vicinity of the third air inlet 701, whereby forming a pressure region in the vicinity thereof and on the outer portion 2 of the housing.

The resistance of the air resistance hole can be reduced if a motor having low energy consumption is used. And then air having a speed higher than the vehicle speed is sprayed from the air outlet 803, which turns the back of the vehicle into a forward driving area. Reaction force generated thereby helps the vehicle to travel at a high velocity. The structure can be used for producing racing cars or sports cars.

If the motor 804 has a large power, original power of the vehicle can be switched off. This is because that after lift force is eliminated, weight of the vehicle is greatly reduced, at this time, large driving force is not required, and a turbofan engine with small power can be used. The vehicle features low energy consumption with respect to existing vehicles.

Alternatively, the bottom air-flow channel, the air inlet and the air outlet are not used. An air-flow channel 4 is formed between the outer portion 2 and the inner portion 3 and surrounds the vehicle. Air inlets 701 and 702 are uniformly distributed around the housing. An airflow controller 704 is disposed in a decorative window 703 of the air inlet. One end of a motor 804 in each of the air inlet and the air outlet 803 is connected to the air-flow channel. As the vehicle travels at a high velocity, the motor 804 absorbs air in the vicinity of the air inlets, which reduces resistance of the air resistance wall and the air resistance hole to the minimum and saves energy.

Figure 6:
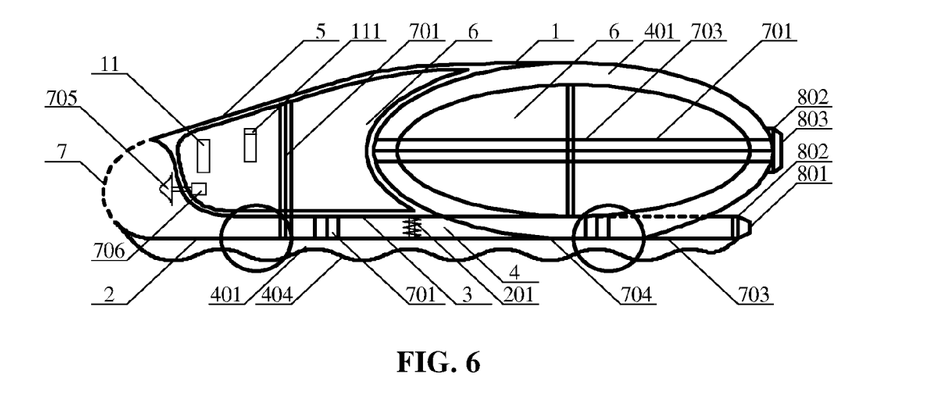
FIG. 6 is a front view of an energy-saving vehicle of a third embodiment of the invention.
Figure 7:
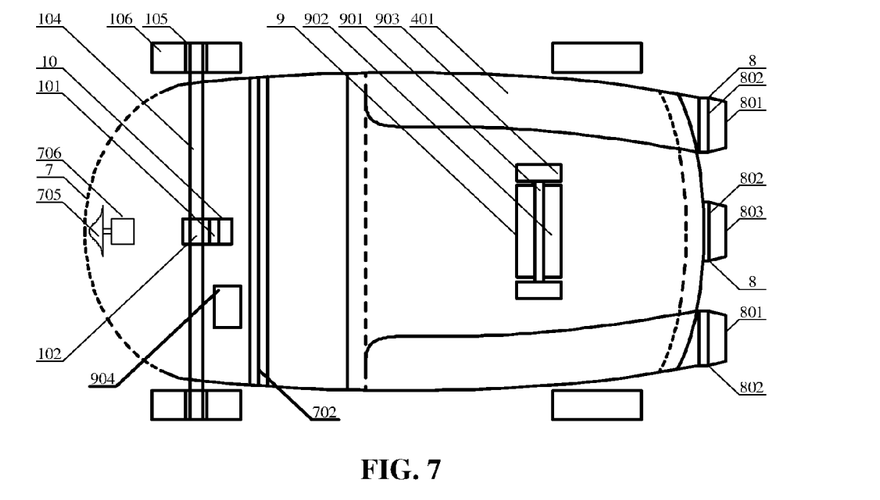
FIG. 7 is a top view of an energy-saving vehicle of a third embodiment of the invention.

As shown in FIGS. 6 and 7, an energy-saving vehicle of a third embodiment of the invention comprises a housing comprising an outer portion 2 and an inner portion 3, windshield 5, a door 6, a first air inlet 7, an air-flow channel, a pair of first air outlets 801 and a second air outlet 803. The first air outlets 801 are disposed on both sides of the bottom at the back of the vehicle, and the second air outlet 803 is disposed at the center of the back of the vehicle. The air-flow channel is formed between the outer portion 2 and the inner portion 3, and comprise a first sub-air-flow channel 4 and a second sub-air-flow channel 401 connected to each other. The first sub-air-flow channel 4 is linear, and the second sub-air-flow channel 401 is annular.

A rotating head 705 is disposed at the center of the first air inlet 7 and driven by a motor 706. The rotating head 705 is in the shape of a cone, a flying plate, a hemisphere, a stream line and so on. The rotating head 705 generates centrifugal force by rotating at a high speed. Under the centrifugal force, air is induced into the first sub-air-flow channel 4, whereby avoiding resistance generated by knocking into forward air resistance and applied on the inner portion 3. A contact surface between the rotating head 705 and the air has concave or convex helix.

Multiple fitting portions are disposed on the vehicle for installing the windshield 5 and the door 6. The door 6 employs a double-layer hollow structure, and is connected to the air-flow channel via a third air inlet 701. The windshield 5 and the door 6 are disposed between the first air inlet 7 and the second sub-air-flow channel 401. The door 6 is connected to the second sub-air-flow channel 401 via the first air inlet 701. Various beautiful vehicles are formed by the second sub-air-flow channel 401, the inner portion 3, the outer portion 2 and the door 6. Compared with the existing vehicle, the invention is more simple and practical, and greatly reduces production cost. The first air inlet 7, the first air outlets 801, and the second air outlet 803 are sequentially connected.

At least a third air inlet 701 is disposed on both sides and at the top and bottom of the first sub-air-flow channel 4 and the second sub-air-flow channel 401, and a second air inlet 702 is disposed at the bottom thereof, so that the first sub-air-flow channel 4 and the second sub-air-flow channel 401 are connected to the outside. Multiple decorative windows 703 with different size are disposed on all the air inlets and air outlets according to shapes thereof. The air inlets are disposed in the decorative window 703, and in the shape of uniformly-distributed bars, diamonds, square grids, cells, circular holes, stream lines and so on. The air inlet can be fixed, or has an airflow controller 704 for controlling an angle. The decorative window has smooth surface and fluent lines for decoration, and operates to prevent foreign bodies from entering without affecting absorbing and spraying air. In this embodiment, the first air inlet 7 and the third air inlet 701 have the decorative windows and are fixed, and the airflow controller 704 is disposed in the decorative window 703 of the second air inlet 702.

At least a wind indicator 9 is disposed in the first sub-air-flow channel 4, a rotating axis 901 is disposed in the wind indicator 9, a pair of power generators 903 is disposed on both ends of the rotating axis 901, and an impeller 902 is disposed on the rotating axis 901. The power generator 903 is capable of recharging no less than one fuel cell 904 whereby providing an auxiliary power supply. The fuel cell 904 supplies power to a motor 10 and drives a speed reducer 101 to operate.

As the motor 10 rotates at a low speed, torque thereof is large, and thus the motor 10 is difficult to operate. By using the speed reducer 101, wheels 106 of the vehicle are capable of rotating freely. The speed reducer 101 drives a differential gear 102 to operate, and equally distributes torque from the speed reducer 101 to a pair of half shafts 104. As the vehicle turns or travels on an uneven road, driving wheels on both sides thereof rotate at different speeds. The half shafts 104 are connected and fixed to a nave boss 105 in the wheel 106. Rotation of the motor 10 is controlled by a controlling board 11, or functions of traditional four-speed gearbox are integrated on the controlling board 11, or traditional gearboxes can be used to facilitate these functions without accelerator pedals.

A stepless control button 111 is disposed on a steering wheel and operates to adjust a rotation speed of the motor 10. Operation of the motor 10 drives the wheels 106 to rotate (such as forwardly, reversely, slowly and quickly) after transmission. In this invention, there is no accelerator pedal but a brake pedal, which reduces possibilities of traffic accidents.

The speed reducer 101, the differential gear 102 and the half shafts 104 are normal automobile parts in the art.

As the vehicle travels at a high velocity, since the rotating head 705 is driven by the motor 706, rotates at a high speed, and generates centrifugal force that throws air into the first sub-air-flow channel 4. Most resistance of the air resistance wall is induced into the first sub-air-flow channel 4 via the first air inlet 7 having an area approximately or completely the same as a front portion of the housing. Alternatively, the area of the first air inlet 7 is slightly less than that of a front portion of the housing. Vertical air resistance on the windshield cannot be reduced. Under pressure, air of the air resistance hole surrounding the vehicle is induced into the first sub-air-flow channel 4 and the second sub-air-flow channel 401 via the third air inlet 701 and the second air inlet 702 whereby reducing resistance of the air resistance wall and the air resistance hole. At this time, a length of each of the first sub-air-flow channel 4 and the second sub-air-flow channel 401 is larger than that of an upper portion of the vehicle, whereby eliminating lift resistance. Since air speed at the bottom of the vehicle is greater than that at the top thereof, and air pressure at the top of the vehicle stably presses an upper portion of the housing, which makes the vehicle travel more stably, safely and economically.

The air outlet sprays air of the air resistance wall and the air resistance wall from the air inlets in the air-flow channels at a speed higher than the vehicle speed. If there is a large amount of air, reverse air resistance reaching the back of the vehicle and operating to close the air resistance hole entrance surrounds the vehicle, fills the pressure region at the back of the vehicle, causes pressure resistance at the back to disappear, and turns the pressure region into a high pressure region.

A removable head 802 on the air outlet 8 controls two bottom air outlets 801 and a middle air outlet 803 to spray air in a desired direction. Since a length of a path of the air passing through the air-flow channel is far larger than that of an upper portion of the housing, the decorative window 703 operating to control an angle of the airflow controller 704 is disposed in the second air inlet 702, and operates to control incoming air of the bottom air-flow channel and solve a problem of large pressure at the top of the vehicle after lift force is eliminated.

Figure 8:
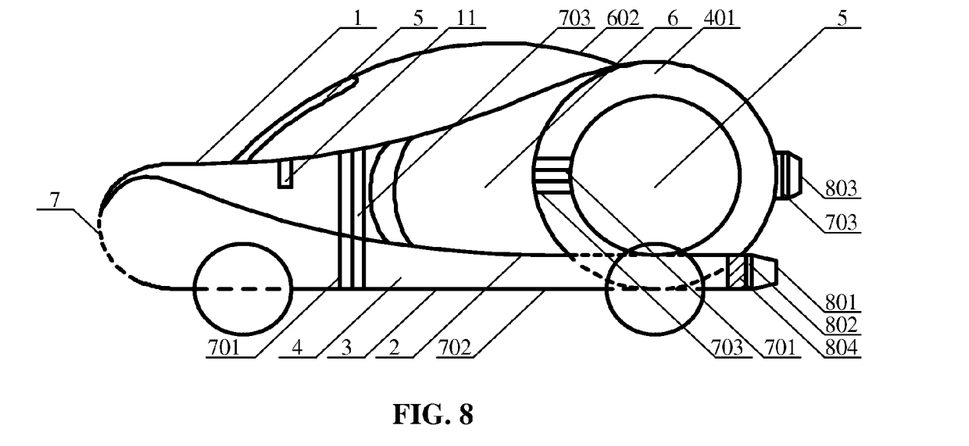
FIG. 8 is a front view of an energy-saving vehicle of a fourth embodiment of the invention.

As shown in FIG. 8, difference between an energy-saving vehicle of a fourth embodiment of the invention and that of the third embodiment is, the second sub-air-flow channel 401 is an annular hole, and a pair of motors 804 are disposed in the air outlets 801 at the bottom of both sides of the vehicle. The motor 804 can operate after the airflow controller disposed in the decorative window 703 closes the air outlet 803.

As the vehicle travels at a high velocity, since the motor 804 has strong suction power and is capable of quickly absorbing air in the vicinity of the air inlets, a pressure region is formed in the vicinity thereof and in the front and on the surface of the housing, which reduces resistance of the air resistance wall and the air resistance hole. Since a length of a path of the air passing through the first sub-air-flow channel and the second sub-air-flow channel is far larger than that of an upper portion of the housing, the lift resistance disappears, and the vehicle travels more stably, safely and economically. Air sprayed from the air outlet has a speed higher than the vehicle speed, and instantly fills the pressure region at the back of the vehicle, which causes a low pressure region to disappear and a high pressure region not to be formed, and turns the back of the vehicle into a forward driving area.

The resistance of the air resistance hole can be reduced if a motor having low energy consumption is used. And then air having a speed higher than the vehicle speed is sprayed from the air outlet 803, which turns the back of the vehicle into a forward driving area. Reaction force generated thereby helps the vehicle to travel at a high velocity. The structure can be used for producing racing cars or sports cars.

A main body of the vehicle is formed by the outer portion 2 and the inner portion 3 that are curved. If borders of the outer portion 2 and the inner portion 3 are made of metal materials, they will be more firm. The outer portion 2 and the inner portion 3 are made of engineering plastics or light-weight materials such as carbon fibers and fiber glass, which reduces light of the vehicle and guarantees strength thereof. The windshield 5 is disposed in the annular hole. A foldable roof 602 can be folded or unfolded via controlling, which forms a novel, simple, light-weight, safe and reliable racing car or a sports car. The third air inlet 701, the second air inlet 702 and the air outlet 803 each has a decorative window 703 with an airflow controller. Strong suction power generated by the motor 804 increases air speed in the air-flow channel and the air inlets, and then air is sprayed from the air outlet at a speed higher than the vehicle speed. The air having a speed far higher than the vehicle speed instantly fills a pressure region at the back of the vehicle, and large reaction force is generated and helps the vehicle to travel. If the motor 804 has a large power, original power of the vehicle can be switched off and the motor 804 provides power. Alternatively, the motor 804 is not used and the air outlets 801 and 803 naturally exhaust gas, at this time, the invention is a good racing car or a sports car with good performance.

Figure 9:
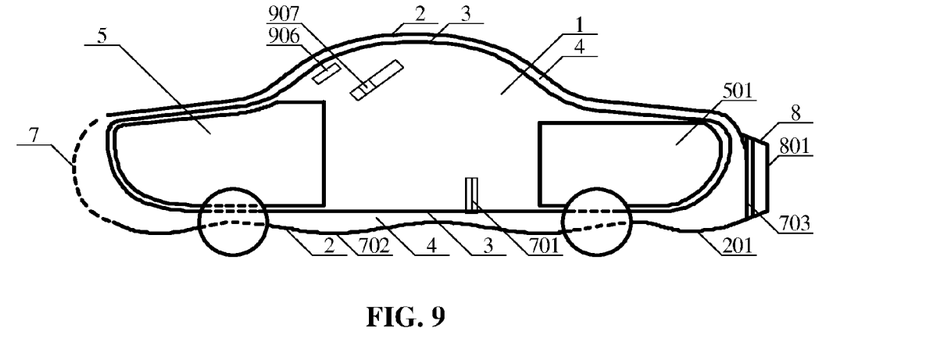
FIG. 9 is a front view of an energy-saving vehicle of a fifth embodiment of the invention.
Figure 10:
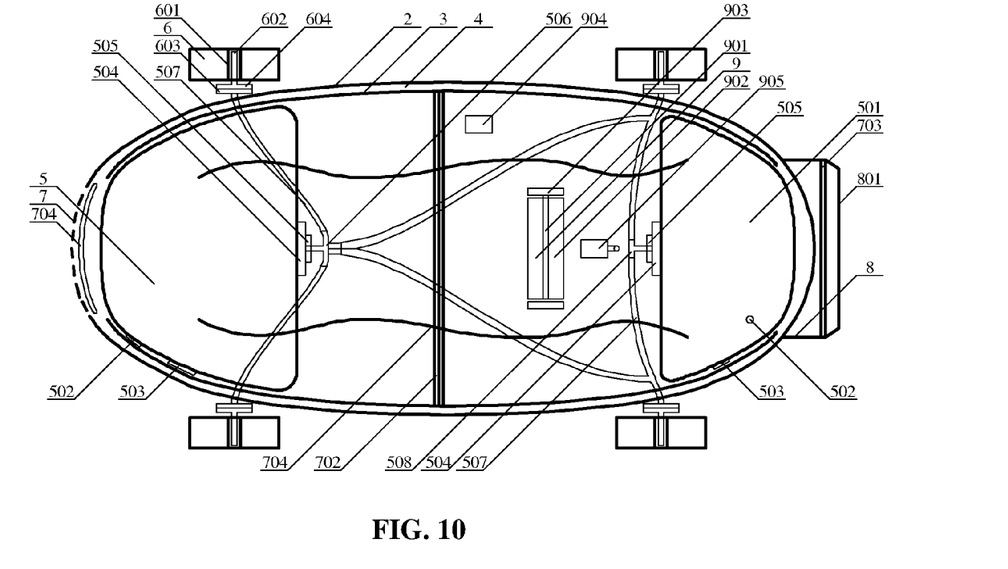
FIG. 10 is a top view of an energy-saving vehicle of a fifth embodiment of the invention.

As shown in FIGS. 9 and 10, an energy-saving vehicle of a fifth embodiment of the invention is illustrated. A control board 906 is disposed on an instrument penal of the vehicle 1. A speed controlling button 907 is disposed on a steering wheel and operates to control a stepless control button to control a speed of the motor. There is only a brake pedal below feet of a driver, which prevents traffic accidents usually caused by erroneous operation of accelerator pedals and the brake pedals and guarantees safety of travelling.

The vehicle 1 comprises a housing comprising an outer portion 2 and an inner portion 3, and an air-flow channel 4 is formed between the outer portion 2 and the inner portion 3. A first air inlet 7 having an area approximately or completely the same as a front portion of the housing is disposed in the front of the outer portion 2. A decorative window 703 is disposed on the first air inlet 7. Multiple vent holes in the shape of square grids are disposed in the decorative window 703 and operate as ornaments for filtering impurities in air.

The first air inlet 7 receives air of an air resistance wall as the vehicle travels. The air is induced into the air-flow channel 4 via the first air inlet 7. At this time the air resistance hole tightly surrounds the housing of the vehicle and generates another resistance. At least a third air inlet 701 and a second air inlet 702 are disposed at the top and on one side of the vehicle and provide outlets for the air resistance hole. Under inward pressure, part of the air is induced into the air-flow channel 4, whereby reducing resistance of the air resistance wall and the air resistance hole.

A spoiler 201 is disposed at the bottom of the outer portion 2, and connected to the air-flow channel 4 via at least one first air inlet 702, whereby increasing air speed at the bottom of the vehicle and a length of a path of air passing through the air-flow channel.

A surface of a spoiler 201 is in the shape of concave-convex stream line whereby increasing a length of air passing through the spoiler 201. Since a speed of the air passing through the spoiler 201 is greater than a plane, speed of the air passing through the bottom of the vehicle is increased. Moreover, since a length of a path of the air passing through the spoiler 201 is greater than that of an upper portion of the housing, lift resistance disappears. Then the air-flow channel transfers air induced from all air inlets to the air outlet 8 at the back of the housing 2, and the air is sprayed from the air outlet 801 at a high speed. A decorative window 703 is disposed in the air outlet 8 and operates to control an airflow controller. If there is a large amount of air, the air fills a low pressure region at the back of the vehicle, a big pressure cannot be formed, the back of the vehicle is turned into a high pressure region, and resistance as the vehicle travels is reduced.

As for the vehicle of the invention, air pressure at the bottom of the vehicle is slightly less than that at the top thereof, and the air pressure at the top stably presses the upper portion of the housing. Under a same speed and size, the vehicle of the invention is more stable, safe and economical than a vehicle of 2 tons. Since weight of the vehicle is not taken into account so as to overcome air resistance, a weight of the vehicle of the invention is greatly reduced. Light-weight and firm materials are used as a body, and an overall weight of the vehicle is 350 Kg, including weight of a gas storage device and gas. Namely, the weight of the invention is only ⅕ than that of a normal car which is 1.3-2 tons, and energy is saved by approximately 80%. Moreover, since materials for producing the vehicle are saved by 80% in weight, production cost is greatly reduced.

The vehicle of the invention further comprises an air motor operating to drive wheels. Airflow control of the air motor is implemented by a multi-way electromagnetic valve whereby driving the vehicle to travel. A main gas-storage device 5 is disposed in the front of the vehicle 1, and an auxiliary gas-storage device 501 is disposed at the back thereof, a gas inlet 502 is disposed on each of the main gas-storage device 5 and the auxiliary gas-storage device 501 and makes it possible to inject gas therein. A barometer 503 is disposed on each of the main gas-storage device 5 and the auxiliary gas-storage device 501 and makes it possible to observe a pressure state thereof. A pressure regulating valve 504 is connected to a gas outlet of each of the main gas-storage device 5 and the auxiliary gas-storage device 501 and operates to adjust gas pressure of compressed gas therefrom. A flowvalve 505 is connected to the pressure regulating valve 504. A multi-way valve 506 is connected to the flowvalve 505. Each way of the multi-way valve 506 can be independently switched on or off via controlling and connected to the air motor 603 via a pipe 507. The multi-way valve 506 connected to the flowvalve 505 of the main gas-storage device 5 is a five-way electromagnetic valve, and four ways thereof are connected to the air motors 603 on four wheels. The multi-way valve 506 connected to the flowvalve 505 of the auxiliary gas-storage device 501 is a three-way electromagnetic valve, and two ways thereof are connected to the air motor 603 on two rear wheels. The pipe 507 induces compressed air in and drives the air motor 603. A rotating shaft 602 of the air motor 603 is fixed to a nave boss 601 via a speed reducer 604, whereby forcing the driving wheel 6 to rotate.

At least a wind indicator 9 is disposed in the air-flow channel 4 between the first air inlet 7 and the air outlet 8. As the vehicle travels, air enters the air-flow channel 4 and drives an impeller 902 and a rotating shaft 901. A pair of generators 903 (or air pumps) is connected to both ends of the rotating shaft 901. Electric energy produced by the generator 903 is stored in at least a fuel cell 904, or directly used to drive an air compressor 905 to inflate for the main gas storage device 5. The full cell 904 supplies power for devices in the vehicle, such as lights, audio devices and control circuit boards 906.

In this embodiment, four-wheel drive is implemented by the air motor 603. Alternatively, the front wheels, the rear wheels or only one wheel is driven by the air motor 603, which makes the invention convenient for use on crowded roads and during parking. Moreover, the motor 10 in FIGS. 6 and 7 can be replaced by the air motor 603 whereby driving the front wheels or the rear wheels, or the full cell can be used to drive the air pump 905 to store gas for the gas storage device whereby driving the air motor 603. Alternatively, the air motor 603 can be replaced by an electric motor powered by the fuel cell.

The vehicle of this embodiment makes use of compressed air that is an inexhaustible energy. However, since the gas storage device has a large size and dynamic energy generated by the compressed air is limited, the following requirements should be met: 1) the body of the vehicle is light and safe; 2) the compressed air should be effectively used. Since the invention is capable of eliminating the lift resistance and the overall weight of the vehicle is approximately 350 Kg, the air motor directly drives all the wheels and a transmission process is greatly simplified. Therefore, as long as design is reasonable, the simpler the vehicle is, the more reliable it will be, and the less failure rate will have, and energy waste caused by injecting the compressed air in an engine for driving the transmission system is prevented. Moreover, the wind indicator is capable of supplying power to the vehicle as the vehicle travels, and therefore production of a vehicle driven by the compressed air or the fuel cell is feasible.

Figure 11:
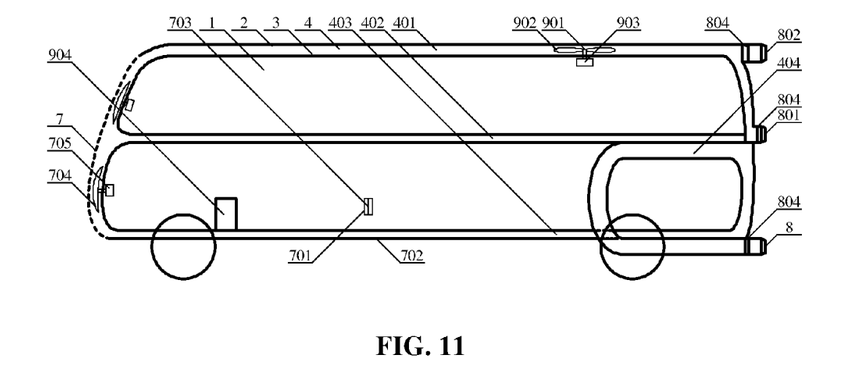
FIG. 11 is a front view of an energy-saving vehicle of a sixth embodiment of the invention.

As shown in FIG. 11, an energy-saving double-deck vehicle of a sixth embodiment of the invention comprises a housing comprising an outer portion 2 and an inner portion 3, and an air-flow channel 4 is formed between the outer portion 2 and the inner portion 3. The air-flow channel 4 surrounds an upper compartment and a lower compartment. An upper air-flow channel 401, a middle air-flow channel 402 and a lower air-flow channel 403 are respectively connected to a first air inlet 7 and a pair of air outlets 802 and 801. The air outlets 802 and 801 are disposed at the back of the vehicle and each has a same width as the housing. At least a wind indicator 901 is disposed in the air-flow channel 4 and driven by air whereby forcing an impeller 902 to rotate to drive a generator 903. Power generated by the generator 903 recharges a battery 904 operating as an auxiliary power supply.

As the double-deck vehicle travels at a high velocity, a pair of motors 705 are disposed at the bottom and the top of the first air inlet 7, and operate to drive a rotating head 704 to operate at a high speed whereby generating centrifugal force to throw vertical air resistance into the air-flow channel, preventing crash between the air and the inner portion 3, and reducing vertical resistance of the air resistance wall. The first air inlet 7 having an area approximately or completely the same as that of a front portion of the housing induces the air resistance wall in the air-flow channels 4, 401, 402 and 403. Multiple strip-shaped decorative windows 703 are disposed on at least one of the second air inlet 702 and the third air inlet 701, whereby inducing part of air of the air resistance hole firmly surrounding the housing in the air-flow channels 4, 401, 402 and 403. At this time, under pressure, air resistance holes in the vicinity of the air inlets and firmly surround the housing are pushed into the air inlet, and air of vertical and lateral air resistance wall and air resistance hole is induced into the air-flow channel, which causes large amount of air uniformly distributed on and in the vicinity of the air inlet is induced and form a pressure region at the surface of the housing. The first air-flow channel 403 is connected to the first air inlet 7, and the annular hole 404 is connected to the air outlet 8.

As air passes the bottom air-flow channel 403 and the annular 404, a length of the air passing through the bottom air-flow channel 403 and the annular 404 is larger than that of an upper portion of the housing, and an air speed is higher than that at the top of the vehicle. At this time lift resistance is eliminated, air pressure at the top of the vehicle stably presses the upper portion of the housing, and thus the vehicle travels more quickly, stably, safely and economically. The air-flow channel sprays air of the air resistance wall, the air resistance hole and at the bottom of the vehicle from the air outlets 802, 801 and 8 at a speed higher than an air speed at the top of the vehicle. A removable head 804 can be used to change an angle of spraying whereby forcing air of the air resistance hole to reach the back of the vehicle simultaneously for continuity of air, to close the air resistance hole entrance, and to surround the air sprayed from the air outlet. The gas instantly fills a pressure region at the back of the vehicle, and causes a low pressure region at the back thereof to disappear and a big pressure not to be formed.

Since air distribution of the double-deck vehicle is changed, lift resistance is eliminated and pressure at the top of the vehicle is larger than that at the bottom thereof. Therefore the vehicle does not need to overcome lift resistance by increasing a weight thereof, which decreases weight of the vehicle, improves holding capacity, and makes the vehicle travel more stably, safely and economically. The double-deck vehicle can travel in cities, or operates as a long-distance bus featuring improved transport capacity. The principle of the invention can be applied to a double-deck train, in which the air inlet and the air outlet are connected to different carriages via the air-flow channel, and thus transport capacity thereof is greatly improved and transport cost is reduced. The principle of the invention can be applied to a single-deck train, subways, large buses and large juggernauts.

Figure 12:
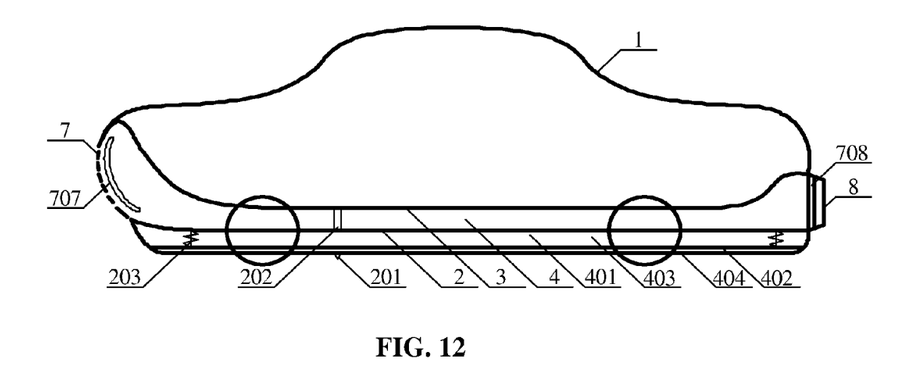
FIG. 12 is a front view of an energy-saving vehicle of a seventh embodiment of the invention.

As shown in FIG. 12, an energy-saving vehicle of a seventh embodiment of the invention comprises a first air inlet 7, an air outlet 8, and an air-flow channel 4. The first air inlet 7 is disposed in the front of the vehicle 1, and the air outlet 8 is disposed at the back of the vehicle and connected to the first air inlet 7 via the air-flow channel 4. A decorative window 707 is disposed in the first air inlet 7, and multiple vent holes in the shape of a diamond are disposed therein, whereby enabling air to freely pass through without hindrance and preventing foreign bodies from entering. A decorative window 708 is disposed in the air outlet 8, and an airflow controller is disposed therein. Opening or closing, and an angle of the air outlet 8 can be controlled via the airflow controller. In emergency cases such as reducing a speed or braking, the airflow controllers in the decorative window 708 is closed, large resistance is generated in the air-flow channel since large amount of air cannot be discharged from the air outlet 8, which naturally reduces the vehicle speed, and makes the vehicle travel more safely with the help of a brake. As the vehicle travels at a high velocity, a first air inlet 7 having an area approximately or completely the same as a front portion of the housing induces air of the air resistance wall in the air-flow channel 4 and sprays the air from the air outlet 8, and the air instantly fills the pressure region at the back of the vehicle, which causes a high pressure region not to be formed, turns the back of the vehicle into a forward driving area, and reduces energy consumption of the vehicle.

An inflating device is disposed at the bottom of the housing. A rectangular air cushion 401 is formed after being inflated by an air pump via a pipe 202, and reduces a distance between a road and a bottom 404 of the air cushion, whereby preventing obstacle on the road from affecting the vehicle and making the vehicle travel more conveniently. Moreover, air passing the bottom of the vehicle is greatly decreased, which further reduces air resistance and lift resistance. As road condition is poor or the air cushion 401 is to be folded, it is deflated via a deflating vent 201, and then at least a reset spring 203 disposed at the bottom thereof upwardly folds the air cushion 401 and attaches the cushion 401 to the outer portion 2 of the housing. A hand air pump can be used by the deflating vent 201 to inflate the air cushion 401. A light-weighted sheet 402 is disposed in the bottom 404 of the air cushion, and the bottom 404 of the air cushion is formed by soft materials such as leather, soft plastics, cloths, rubbers and so on. One side of a sealing frame 403 is connected to the outer portion 2, and the other side thereof is connected to the bottom 404 of the air cushion whereby forming multiple air cushions 401, 403 and 404. Alternatively, the bottom 404 can be replaced by a concave-convex spoiler.

Figure 13:
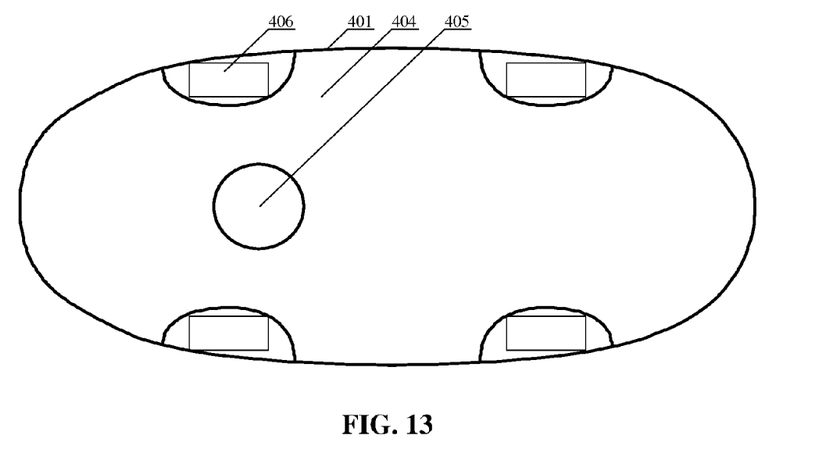
FIG. 13 is a top view of an air cushion of an energy-saving vehicle of a seventh embodiment of the invention.

As shown in FIG. 13, the air cushion 401 can be designed to have different areas and separately disposed at the bottom of the vehicle.

Alternatively, an air cushion 401 having a same area as the bottom of the vehicle can be used. An air outlet 405 is disposed at the center of the bottom 404 of the air cushion 401 and operates to discharge air generated by an engine in the front of the vehicle to the ground. A vertical plane or a horizontal plane of the bottom 404 is concave-convex, which increases an air speed. Or the air cushion 401 is disposed at a first half part or a second half part at the bottom of the vehicle.

Figure 14:
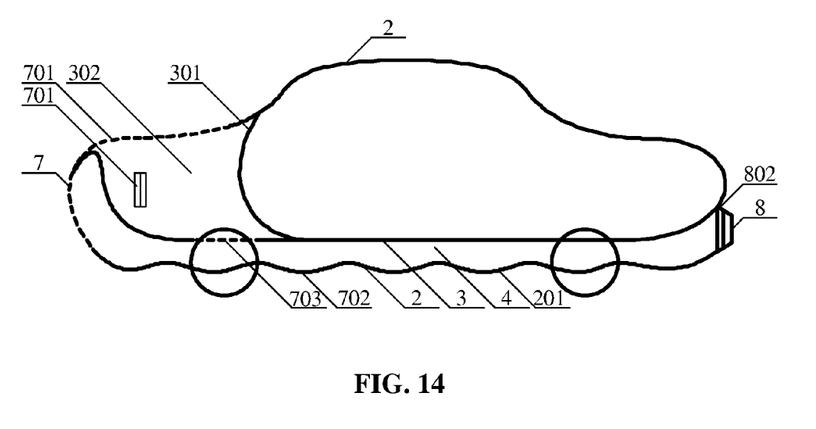
FIG. 14 is a front view of an energy-saving vehicle of an eighth embodiment of the invention.

As shown in FIG. 14, an energy-saving vehicle of an eighth embodiment of the invention comprises a first air inlet 7, an air outlet 8, and an air-flow channel 4. The first air inlet 7 is disposed in the front of the vehicle, and the air outlet 8 is disposed at the back of the vehicle and connected to the first air inlet 7 via the air-flow channel 4. A decorative window 802 is disposed in the air outlet 8, and an airflow controller is disposed therein. Airflow and an angle of the air outlet 8 can be controlled via the airflow controller, whereby controlling airflow in the air-flow channel 4 and resistance and lift resistance generated by the airflow. In emergency cases such as reducing a speed or braking, the decorative window 802 is closed, large resistance is generated by high-speed air in the air-flow channel, which naturally reduces the vehicle speed, and makes the vehicle travel more safely with the help of a brake. The air-flow channel 4 is connected to an engine room 302 via a first air inlet 703. An arc-shaped plate 301 can be used to separate the engine room 302. At least a third air inlet 701 at the top and on both sides of the vehicle is connected to the engine room 301, and a second air inlet 702 is connected to the air-flow channel 4.

As the vehicle travels at a high velocity, since the outer portion 2 is a concave-convex spoiler 201, and a path of air passing through inside and outside of the spoiler 201 is larger than that of an upper portion of the housing, lift resistance is eliminated.

The first air inlet 7 having an area approximately or completely the same as a front portion of the housing induces air of the air resistance wall in the parabolic concave-convex air-flow channel 4, but vertical resistance on a windshield is not reduced. At least a third air inlet 701 at the top of the vehicle and a first air inlet 703 on one side thereof induce part of the air in the engine room 302 whereby dissipating heat from a water tank and an engine, and then the air is induced tin the air-flow channel 4 via the first air inlet 703. Air at the bottom of the vehicle is induced in the air-flow channel 4 via the second air inlet 702 whereby balancing air in the outer portion 2 with that outside the outer portion 2. The air-flow channel 4 induces air from all the air inlets in the decorative window 802 of the airflow controller and then the air is sprayed from the air outlet 8, whereby turning the back of the vehicle into a high pressure region and reduces energy consumption of the vehicle.

As can be seen that as long as the spoiler 201 is added to the bottom of the vehicle whereby forming the air-flow channel 4 between the spoiler 201 and the bottom thereof, a length of a path of air passing the air-flow channel 4 is greater than that of the upper portion of the housing and lift resistance disappears. Especially, since air resistance is proportional to a cross section of a windward side of the vehicle, and the windward side is an air inlet having an area approximately or completely the same as the housing, vertical resistance is turned into friction force on the air-flow channel and resistance of a vertical air resistance wall is greatly reduced. A separating plate can be added to the bottom of the vehicle whereby forming an air inlet and an air outlet connected to the air-flow channel 4, which improves holding capacity and safety of the vehicle and reduces resistance and energy consumption thereof. The spoiler 201 can form the air-flow channel 4 via a plane.

Figure 15:
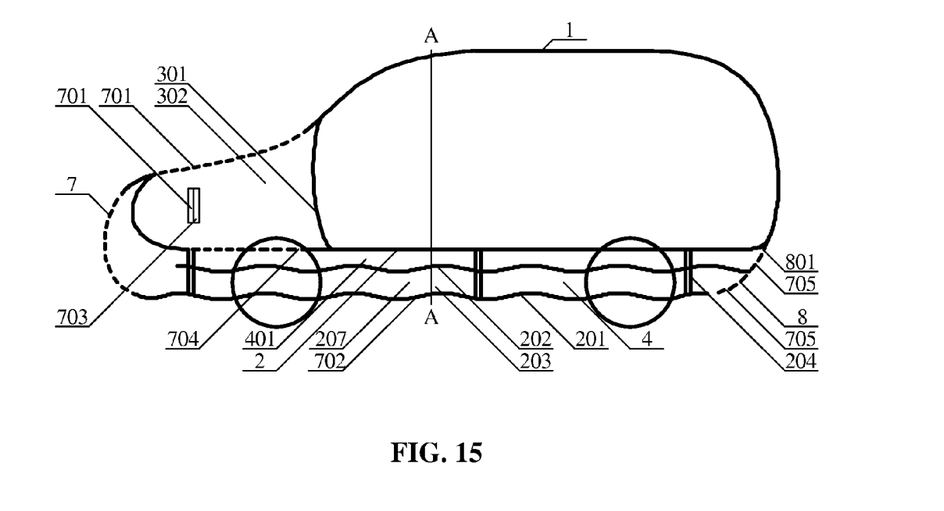
FIG. 15 is a front view of an energy-saving vehicle of a ninth embodiment of the invention.
Figure 16:
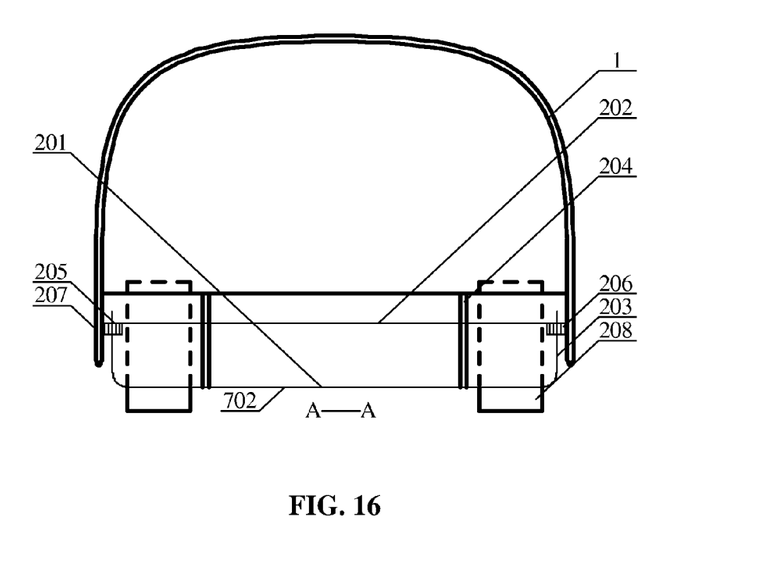
FIG. 16 is a cross-sectional view of an energy-saving vehicle of a ninth embodiment of the invention.

As shown in FIGS. 15 and 16, difference between an energy-saving vehicle of a ninth embodiment of the invention and that of the eighth embodiment is, a concave-convex spoiler 202 is added to the air-flow channel 4 whereby forming two air-flow channels 401 and 4. The first air inlet 7 is connected to the air-flow channel 4 and the air outlet 8. The first air inlet 7 is connected to the air-flow channel 401 and the air outlet 801. One end of a removable rod 204 is fixed to the inner portion 3 of the housing, and the other end thereof is fixed to the spoiler 201. The removable rod 204 can be stretched or contracted via control such as hydraulic pressure, air pressure and electromotive action. Multiple removable rods 204 that are reasonably arranged are capable of forcing the spoiler 201 to move upwards or downwards. Alternatively, the removable rod 204 is not used and the spoiler 201 moves upwards or downwards via mechanical control, which is well-known in the art. A sealing plate 203 is disposed in the vicinity of the air-flow channel 4. The bottom of the sealing plate 203 is connected to the spoiler 201, and the top thereof is disposed in a removable groove 205 in a frame 207 at the bottom of the vehicle. A rubber ring 206 is disposed in the removable groove 205 and operates to seals the air-flow channel 4 as the sealing plate 203 passes the rubber ring 206. The sealing plate 203 can be moved upwards or downwards within a certain distance whereby increasing or reducing a distance between the spoiler 201 and the road. As the spoiler 201 moves downwards, the distance between the spoiler 201 and the road is reduced, air is reduced and traveling of the vehicle is not affected. As a road condition is poor, the spoiler 201 moves upwards, the distance between the spoiler 201 and the road is increased and the vehicle is capable of traveling normally.

As the vehicle travels at a high velocity, the movable rod 204 moves the spoiler 201 downwards whereby reducing the distance between the spoiler 201 and the road, at this time the air entering the bottom of the vehicle is reduced, which increases a speed of the vehicle, reduces air resistance, and eliminates lift resistance.

As the vehicle travels at a high velocity, the first air inlet 7 having an area approximately or completely the same as a front portion of the housing induces air of the air resistance wall in the air-flow channels 4 and 401, and the third air inlet 701 induces part of air at the top and on one side of the vehicle in the engine room 302. Meanwhile, the first air inlet 7 induces part of air in the air-flow channel 4, and the second air inlet 702 induces air in the air-flow channel 4. The air-flow channels 4 and 401 formed by spoilers 201 and 202 cause a length of a path of air passing therethrough to be greater than that of an upper portion of the housing whereby eliminating the lift resistance, and then spray the air from the air outlets 8 and 801. The air instantly fills a pressure region at the back of the vehicle, eliminates pressure resistance, and turns the back of the vehicle into a high pressure region.

Multiple decorative windows 703 are disposed on all air inlets and the air outlet.

For the energy-saving vehicle of the invention, it comprises a housing comprising an inner portion and an outer portion, at least an air-flow channel, at least a first air inlet, and at least an air outlet. There is a certain distance between the inner portion and the outer portion of the housing. The air-flow channel is formed between the inner portion and the outer portion of the housing. The first air inlet is disposed in the front of the housing, and the air outlet is disposed at the back of the housing. The first air inlet, the air outlet and the air-flow channel are connected. At least a third air inlet is disposed on each side of the housing. At least a second air inlet is disposed at the bottom of the housing and connected to the air-flow channel.

The number of the air-flow channels is one or more. If more than one air-flow channel is used, at least a spoiler is disposed between adjacent air-flow channels whereby separating the air-flow channels. Each of the air-flow channels may be completely independent (namely separated from each other without connection) or semi-independent (namely separated from each other but connected). Surface of the air-flow channel is a smooth parabola in the shape of a stream line, which increases a length of a path of air passing therethrough and an air speed. At least a wind indicator driven by air is disposed in the air-flow channel and supplies power to a fuel cell.

The existing vehicle consumes enormous energy during traveling since its front portion and side portion knocks into the air resistance wall and has a pressure region at the back thereof. As for the vehicle of the invention, since air of the air resistance wall and the air resistance hole is induced into the air-flow channel, a pressure region is formed in the front of the vehicle and in the vicinity of the air inlet on each side thereof, and the air is sprayed from the back of the vehicle at a speed higher than the vehicle speed, the air instantly eliminates resistance of the pressure region, and eliminates the pressure region at the back of the vehicle and a big pressure region generated by the air resistance hole, and forms a high pressure region, which saves power and increases the vehicle speed.

The outer portion surrounds the inner portion, and the air-flow channel is disposed therebetween and operates to allow air to pass through. The inner portion is a seal, and air cannot enter therein. The outer portion is a ventilation layer that allows air in the vicinity of the vehicle to enter the air-flow channel and to be sprayed form the air outlet. The air inlet is disposed in the forefront of the housing knocking to the air resistance wall and has an area approximately or completely the same as the housing, the air outlet is disposed at the back of the vehicle and connected to the air-flow channel.

A concave hole is disposed below the inner portion of the housing, and connected to the air inlet and the air outlet. The concave hole is in the shape of a stream line. The inner portion and the outer portion are in the shape of a stream line, which makes it possible for air to quickly pass through the air-flow channel without hindrance and to be sprayed from the air outlet. A removable sleeve is disposed on the air outlet and operates to adjust a direction, and makes it possible for air to be sprayed from three directions. By adjusting an angle by the removable sleeve at different vehicle speeds, the air sprayed from the air outlet is capable of preventing closing of the air resistance hole entrance.

An airflow controller is disposed in the decorative window and operates to adjust an angle, or air inlets in the shape of uniformly-distributed bars, diamonds, square grids, cells, circular holes, stream lines and so on are disposed in the decorative window. At least an air inlet is disposed at the bottom of the housing, and operates to induce air at the bottom of the vehicle in the air-flow channel, whereby balancing air speed at the bottom of the vehicle with that in the air-flow channel before the air is discharged from the air outlet. Thus, problems such as unsafe traveling and waste of gas caused by lift resistance (since air speed at the bottom of the vehicle is less than that at the top thereof) are solved. As long as the air speed at the bottom of the vehicle is great than or equal to that at the top thereof, the vehicle is capable of traveling more quickly, safely, stably and economically.

A rotating head is disposed between the concave hole and the air inlet, and a contact surface between the rotating head and the air has multiple concave or convex helixes for dividing the air. The rotating head is in the shape of a cone, a flying plate, a hemisphere, an impeller, a stream line and so on, and can be driven by a motor. As the vehicle traveling at a high velocity knocks into the air resistance wall, under centrifugal force, air in front of the vehicle is separated via the rotating head and an air-flow channel is instantly formed, which prevents resistance generated by the air knocking into the housing and makes it possible to induce air into the air-flow channel.

As for the vehicle of the invention, an accelerator pedal can be removed and only a brake pedal is used. The stepless control button disposed on a steering wheel adjusts a rotation speed of the motor, which makes the vehicle more convenient for use and safely since many traffic accidents are caused by erroneous operation of accelerator pedal and the brake pedal.

The number of the air-flow channels can be one or more. If more than one air-flow channel is used, both ends of each air-flow channel are connected to the air inlet and the air outlet. The air inlet can disposed in the front of the vehicle, or on one side of the vehicle, or at the bottom of the vehicle. The first sub-air-flow channel is connected to the second sub-air-flow channel, and to the air inlet. The air outlet is connected to the second sub-air-flow channel. A cross section of one of the first sub-air-flow channel and the second sub-air-flow channel is curved and in the shape of an ellipse, a circle, a rectangle, a snake, a loop or a stream line. Thus a main body of the vehicle is formed by the curved outer portion and the curved inner portion. After the windshield, the door, the separating plate and the engine are added, a beautiful vehicle is formed. Each of the air-flow channels can be in the shape of a stream line. A spoiler is disposed at the bottom of the vehicle and operates to increase an air speed.

In reforming an existing vehicle, the spoiler can be added to the bottom thereof, or an air-flow channel disposed on a spoiler of the air inlet is connected to the air inlet and the air outlet, so as to reduce energy consumption of the vehicle. The spoiler having a length no less than the upper portion of the vehicle increases and balances an air speed in the air-flow channel and that at the bottom of the vehicle (namely between the spoiler and the ground), and causes an air speed of the inner portion at the back of the vehicle to be approximately equal to that of the outer portion, which completely eliminates the lift resistance. Most or all the lift resistance can be eliminated if the spoiler is disposed at the bottom of the vehicle. To eliminate lift force of the vehicle, the spoiler is disposed at the bottom of the vehicle, or the air inlet at the bottom of the vehicle is connected to the air-flow channel, or both the spoiler and the air inlet are used.

Since the lift resistance is eliminated, the weight of the vehicle is only ⅕ than that of a normal car, energy is saved by approximately 80%, and production cost is significantly reduced.

The invention reduces a distance between the bottom of the vehicle and the road, increases an air speed with the help of the spoiler disposed at the bottom thereof, decreases the air resistance, and eliminates the lift resistance.

A length of the air-flow channel at the bottom of the vehicle is greater than that of an upper portion of the housing, which causes an air speed at the top of the vehicle to be higher than that at the bottom thereof, and eliminates the lift resistance. Air movement during traveling of the vehicle is completely changed, and air pressure at the top of the vehicle stably presses the upper portion of the housing of the vehicle, which makes the vehicle travel more faster, stably, safely and economically, and thus the lift resistance disappears. At this time there is no need to eliminate the lift resistance by increasing weight of the vehicle, and the vehicle only needs to have some basic functions, which greatly reduces energy consumption and production cost of the vehicle.

The first air inlet having an area approximately or completely the same as a front portion of the housing induces air of the air resistance wall in the air-flow channel, and the air inlets uniformly distributed around the housing induce air of the air resistance hole in the air-flow channel and reduce resistance of the air resistance wall and the air resistance hole.

Preventing the air resistance hole from being closed is a key point of solving a problem of high energy consumption. Air of the air resistance wall is induced from the front of the vehicle, and air of the air resistance hole is sprayed from the air outlet. At this time, air of the air resistance hole surrounds the air resistance hole entrance, reverse resistance is turned into forward driving force, the air instantly fills the pressure region at the back of the vehicle, which causes a big and a low pressure region to disappear, and a high pressure region to be formed at the back of the vehicle. A pressure region is formed at the front portion of and in the vicinity of the vehicle, and a high pressure region is formed at the back thereof, which makes the vehicle more economically and reduces energy consumption.

Traditional energy-saving vehicles such as compressed-air-driven vehicles, solar vehicles and fuel cell vehicles are difficult to be commercialized because 1) they are too heavy; 2) transmission systems thereof are too complex, and a great part of power is used by the transmission systems that overcome the lift resistance and air resistance by increasing weight thereof. The vehicle of the invention features a light weight, simplifies the transmission system to the great extent, and provides a new way for commercializing the energy-saving vehicle.

To summarize, the invention is very simple, practical and reliable, and provides a novel method for producing and reforming traditional compressed-air-driven vehicles, solar vehicles and fuel cell vehicles that features short use time and a difficult recharging process.

As used herein, the term "air resistance wall" means air with certain thickness compressed by a vehicle travelling in a high velocity. The faster the vehicle travels, the thicker the air resistance wall will be.

As used herein, the term "air resistance hole" means a virtual hole formed by air on both sides of a vehicle firmly surrounding the vehicle. The faster the vehicle travels, the thicker air resistance hole will be, and the higher pressure the air resistance hole will apply thereto.

One important problem the invention solved is that: in the air-flow channel with the front and the rear thereof connected, a length of a path of the air passing through the channel is larger than that of the upper portion of the vehicle housing, the larger the length, the more the driving force. Obviously, the driving force is not produced by a motor but by the air encountering at the head of the vehicle and reaching the rear of the vehicle synchronously.

The air inlet is sufficiently large, and the air-flow channel at the bottom of the vehicle is arc-shaped and sufficiently wide. Thus, large amount of air with high speed is discharged from the air outlet at the rear of the vehicle. Since the air speed in the air-flow channel is greater than the vehicle speed, a driving force is generated. Thus, the invention provides an effective means for vehicles to save energy.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An energy-saving vehicle, comprising:
   a) a housing comprising an outer portion having an upper portion and a bottom portion, an inner portion, an air-flow channel, at least a first air inlet, and at least an air outlet;
   b) a pair of front wheels;
   c) a pair of rear wheels; and
   d) a steering wheel;
   wherein:
   said air-flow channel is disposed between said outer portion and said inner portion;
   said air-flow channel comprises an upper air-flow channel and a bottom air-flow channel;
   said upper air-flow channel is disposed around said upper portion;
   said bottom air-flow channel is disposed around said bottom portion;

said first air inlet is disposed in the front of the vehicle;
said air outlet is disposed at the back of the vehicle;
said first air inlet and said air outlet are connected to said air-flow channel;
said front wheels and said rear wheels are driven by a power unit;
a length of path for air passing through said bottom air-flow channel is no less than a length of path for air passing through said upper portion; and
at least a second air inlet is disposed at said bottom portion, and connected to said air outlet via said air-flow channel.

2. An energy-saving vehicle of claim 1, wherein a cross section of said air-flow channel is curved.

3. An energy-saving vehicle of claim 1, wherein
said air-flow channel comprises a first sub-air-flow channel and a second sub-air-flow channel;
said first sub-air-flow channel is connected to said first air inlet; and
said second sub-air-flow channel is connected to said air outlet.

4. An energy-saving vehicle of claim 1, wherein at least a third air inlet is disposed on one side and at the bottom of said housing, and connected to said air outlet via said air-flow channel.

5. An energy-saving vehicle of claim 1, wherein an area of said first air inlet is approximately or completely the same as that of a front portion of said housing.

6. An energy-saving vehicle of claim 1, wherein at least a motor is disposed in said air outlet.

7. An energy-saving vehicle of claim 1, wherein
said air-flow channel is divided into at least two sub-air-flow channels via a spoiler in the shape of a concave-convex parabola; and
said air outlet is connected to said first air inlet via said two sub-air-flow channels.

8. An energy-saving vehicle of claim 1, wherein said air-flow channel is connected to said first air inlet and said air outlet after being bent thereby forming a main body of the vehicle.

9. An energy-saving vehicle of claim 1, wherein
at least a decorative window is disposed on said first air inlet and/or said air outlet;
a constant-flow controller with an adjustable angle is disposed in said decorative window; and
said decorative window is in the shape of a square grid, a diamond, a strip, a circular hole, and a stream line.

10. An energy-saving vehicle, comprising:
a) a housing comprising an outer portion having an upper portion and a bottom portion, an inner portion, an air-flow channel, a first air inlet, a second air inlet, an air outlet, and a spoiler;
b) a pair of front wheels;
c) a pair of rear wheels; and
d) a steering wheel;
wherein:
said air-flow channel is disposed between said outer portion and said inner portion;
said air-flow channel comprises an upper air-flow channel and a bottom air-flow channel;
said upper air-flow channel is disposed around said upper portion;
said bottom air-flow channel is disposed around said bottom portion;
said spoiler is disposed in said bottom air-flow channel;
said first air inlet is disposed in the front of the vehicle;
said second air inlet is disposed at said bottom portion;
said air outlet is disposed at the back of the vehicle;
said first air inlet is connected to said air outlet via said air-flow channel;
said second air inlet is connected to said air-flow channel;
said front wheels and said rear wheels are driven by a power unit;
said spoiler divides said bottom air-flow channel into two sub-air-flow channels;
said first air inlet is connected to said air outlet via said two sub-air-flow channels;
said spoiler is in a shape of a concave-convex parabola, whereby a length of path for air passing through said bottom air-flow channel is larger than a length of path for air passing through said upper portion.

11. An energy-saving vehicle of claim 10, wherein a third air inlet is disposed on one side and at the bottom of said housing, and connected to said air outlet via said air-flow channel.

12. An energy-saving vehicle of claim 10, wherein an area of said first air inlet is approximately or completely the same as that of a front portion of said housing.

13. An energy-saving vehicle of claim 1, wherein a motor is disposed in said air outlet.

14. An energy-saving vehicle of claim 10, wherein
a decorative window is disposed on said first air inlet and/or said air outlet;
a constant-flow controller with an adjustable angle is disposed in said decorative window; and
said decorative window is in the shape of a square grid, a diamond, a strip, a circular hole, and a stream line.

15. An energy-saving vehicle of claim 10, wherein said second air inlet is connected to said air outlet via said air-flow channel.

16. An energy-saving vehicle, comprising:
a) a housing comprising an outer portion having an upper portion and a bottom portion, an inner portion, an air-flow channel, at least a first air inlet, and at least an air outlet;
b) a pair of front wheels;
c) a pair of rear wheels; and
d) a steering wheel;
wherein:
said air-flow channel is disposed between said outer portion and said inner portion;
said air-flow channel comprises a bottom air-flow channel;
said bottom air-flow channel is disposed around said bottom portion;
said first air inlet is disposed in the front of the vehicle;
said air outlet is disposed at the back of the vehicle;
said first air inlet and said air outlet are connected to said air-flow channel;
said pair of front wheels and said pair of rear wheels are driven by a power unit; and
a length of path for air passing through said bottom air-flow channel is larger than a length of path for air passing through said upper portion.

17. An energy-saving vehicle of claim 16, wherein a cross section of said air-flow channel is curved.

18. An energy-saving vehicle of claim 16, wherein:
said air-flow channel comprises a first sub-air-flow channel and a second sub-air-flow channel;
said first sub-air-flow channel is connected to said first air inlet; and
said second sub-air-flow channel is connected to said air outlet.

19. An energy-saving vehicle of claim 16, wherein at least a third air inlet is disposed on one side and at the bottom of said housing, and connected to said air outlet via said air-flow channel.

20. An energy-saving vehicle of claim 16, wherein an area of said first air inlet is approximately or completely the same as that of a front portion of said housing.

21. An energy-saving vehicle of claim 16, wherein at least a motor is disposed in said air outlet.

22. An energy-saving vehicle of claim 16, wherein
   said air-flow channel is divided into at least two sub-air-flow channels via a spoiler in the shape of a concave-convex parabola; and
   said air outlet is connected to said first air inlet via said two sub-air-flow channels.

23. An energy-saving vehicle of claim 16, wherein said air-flow channel is connected to said first air inlet and said air outlet after being bent thereby forming a main body of the vehicle.

24. An energy-saving vehicle of claim 16, wherein
   at least a decorative window is disposed on said first air inlet and/or said air outlet;
   a constant-flow controller with an adjustable angle is disposed in said decorative window; and
   said decorative window is in the shape of a square grid, a diamond, a strip, a circular hole, and a stream line.

25. An energy-saving vehicle of claim 16, wherein a motor is disposed in said air outlet.

\* \* \* \* \*